3,209,012
OXATHIA CYCLOPENTANONES

Edith H. Miller and Ingenuin Hechenbleikner, Cincinnati, and Otto A. Homberg, Woodlawn, Ohio, assignors to Carlisle Chemical Works, Inc., Reading, Ohio, a corporation of Ohio
No Drawing. Filed Apr. 2, 1963, Ser. No. 269,864
8 Claims. (Cl. 260—327)

The present invention relates to the preparation of substituted oxathiolanes.

It is known to prepare 4,4-diphenyl-1,3-oxathiolan-5-one derivatives Romo, J. Org. Chem., vol. 24, pages 1490–1493 (1959), and Bistrzycki, Helv. Chim. Acta, vol. 3, pages 447–467 (1920). It is also known to react acetaldehyde with 2 moles of thioacetic acid to form a mercaptal, Bistrzycki and also Berichte, vol. 19, page 1963 (1886), and vol. 21, page 478 (1888).

The preparation of certain perhalo-1,3-oxathiolan-5-one compounds are shown in Simmons Patent 2,911,414.

It is an object of the present invention to prepare novel 1,3-oxathiolan-5-ones.

Another object is to improve the heat and light stability of halogen-containing resins.

An additional object is to provide novel stabilized vinyl resin compositions.

Yet another object is to provide novel synergistic stabilizers for halogen-containing resins.

Still further objects and the entire scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

The novel compounds of the present invention have the following formula

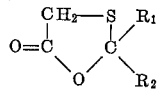

where $R_1$ and $R_2$ individually are hydrogen, alkenyl, alkyl, aralkyl or aryl or together are an alkylene radical having a chain of 4 to 5 carbon atoms.

Examples of compounds within the invention are

1 - oxa - 3-thia-cyclopentanone-5 (1,3-oxathiolane-5-one),
1-oxa-3-thia-2-phenylcyclopentanone-5-,
1-oxa-3-thia-2-o-tolylcyclopentanone-5,
1-oxa-3-thia-2-p-tolylcyclopentanone-5,
1-oxa-3-thia-2-m-tolycyclopentanone-5,
1-oxa-3-thia-2-β-napththylcyclopentanone-5,
1-oxa-3-thia-2-α-naphthylcyclopentanone-5,
1-oxa-3-thia-2-cinnamenylcyclopentanone-5,
1-oxa-3-thia-2-benzylcyclopentanone-5,
1-oxa-3-thia-2-methylcyclopentanone-5,
1-oxa-3-thia-2-ethylcyclopentanone-5,
1-oxa-3-thia-2-isononylcyclopentanone-5,
1-oxa-3-thia-2-propylcyclopentanone-5,
1-oxa-3-thia-2-n-butylcyclopentanone-5,
1-oxa-3-thia-2-isobutylcyclopentanone-5,
1-oxa-3-thia-2-sec. butylcyclopentanone-5,
1-oxa-3-thia-2-amylcyclopentanone-5,
1-oxa-3-thia-2-heptylcyclopentanone-5,
1-oxa-3-thia-2-(1[1] ethyl) propylcyclopentanone-5,
1-oxa-3-thia-2-heptadecylcyclopentanone-5,
1-oxa-3-thia-2-vinylcyclopentanone-5,
1-oxa-3-thia-2-isopropenylcyclopentanone-5,
1-oxa-3-thia-2-heptadecenylcyclopentanone-5,
1-oxa-3-thia-2,2-dimethylcyclopentanone-5,
1-oxa-3-thia-2,2-diethylcyclopentanone-5,
1-oxa-3-thia-2,2-dipropylcyclopentanone-5,
1-oxa-3-thia-2,2-diheptadecylcyclopentanone-5,
1-oxa-3-thia-2,2-diisopropylcyclopentanone-5,
1-oxa-3-thia-2,2-diphenylcyclopentanone-5,
1-oxa-3-thia-2-methyl-2-amylcyclopentanone-5,
1-oxa-3-thia-2-methyl-2-ethylcyclopentanone-5,
1-oxa-3-thia-2-methyl-2-propylcyclopentanone-5,
1-oxa-3-thia-2-ethyl-2-propylcyclopentanone-5,
1-oxa-3-thia-2-methyl-2-t-butylcyclopentanone-5,
1-oxa-3-thia-2-methyl-2-butylcyclopentanone-5,
1-oxa-3-thia-2-methyl-2-phenylcyclopentanone-5,
1-oxa-4-thiaspiro-(4,5)-decanone-2 (1-oxa-3-thia-2,2-pentamethylenecyclopentanone-5),
1-oxa-4-thiaspirononanone-2 (1-oxa-3-thia-2,2-tetramethylenecyclopentanone-5),
1-oxa-4-thiaspiro-(4,5)-6-methyl-decanone-2.

The compounds of the present invention can be prepared by heating 1 mole of mercaptoacetic acid with 1 mole, or preferably a slight excess of 1 mole, of the appropriate aldehyde or ketone and removing 1 mole of water. The reaction is carried out in the presence of a water entrainer such as a hydrocarbon solvent, e.g., toluene, benzene, xylene, or naphtha in the presence or absence of an acid catalyst such as hydrochloric acid, hydrobromic acid, p-toluenesulfonic acid, benzenesulfonic acid, sulfuric acid. By-products can be removed by washing with dilute aqueous alkali.

As starting aldehydes or ketones there can be used formaldehyde, acetaldehyde, propionaldehyde, butyraldehyde, valeraldehyde, isovaleraldehyde, sec. valeraldehyde, caprylaldehyde, 2-ethylbutyraldehyde, stearaldehyde, phenylacetaldehyde, phenylpropionaldehyde, acrolein, crotonaldehyde, cinnamaldehyde, oleylaldehyde, acetone, methyl ethyl ketone, methyl propyl ketone, methyl butyl ketone, methyl isobutyl ketone, methyl t-butyl ketone (pinacolone), stearanone, diethyl ketone, dipropyl ketone, ethyl propyl ketone, benzophenone, acetophenone, α-naphthaldehyde, β-naphthaldehyde, benzaldehyde, o-tolualdehyde, p-tolualdehyde, m-tolualdehyde, cyclopentanone, cyclohexanone, 2-methylcyclohexanone, methyl amyl ketone and isodecaldehyde.

The compounds of the present invention are useful as stabilizers for halogen containing materials particularly when used with tin compounds such as dialkyltin oxides and dialkyltin acylates.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vi nyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% by polymerized vinyl chloride.

As the chlorinated resin there can be employed chlorinated polyethylene having 14 to 75%, e.g., 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

In addition to the novel stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

Examples of suitable tin compounds for use as stabilizers with the compounds of the present invention are dibutyl tin oxide, dibutyltin dilaurate, dioctyltin oxide, dioctyltin dilaurate.

The compounds of the present invention are normally used in an amount of 0.01 to 10% by weight of the resin.

The tin compounds are also normally used in an amount of 0.01 to 10% by weight of the resin. More preferably 0.2 to 5% of the tin compound and 0.2 to 5% of the oxathiolanes of the present invention are used on the weight of the resin.

Unless otherwise indicated all parts and percentages are by weight.

*Example 1*

1 mole of mercaptoacetic acid and 1.1 mole of cyclohexanone were refluxed in toluene with removal of water (the reactants together equalled 80% by weight of the total mixture) until 18 grams of water were obtained. The product was then treated with an equal weight of dilute (10%) aqueous sodium bicarbonate and the water layer containing the sodium salt of cyclohexene-1-mercaptoacetic acid separated from the organic layer. The organic layer was distilled and there was recovered 1-oxa-4-thiaspiro (4,5)-decanone-2 having the formula

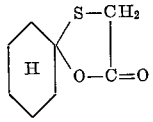

It was a yellow liquid having an $n_D^{24}$ 1.5200 and a B.P. of 93–97° C. at 0.07 mm. Hg. It was identified by infrared spectrum and elemental analysis.

*Example 2*

The procedure of Example 1 was repeated replacing the cyclohexanone by 1.1 moles of methyl ethyl ketone. The product was 1-oxa-3-thia-2-methyl-2-ethyl-cyclopentanone-5, a light yellow liquid having an $n_D^{20}$ 1.4788 and having a B.P. of 90–92° C. at 0.6 mm. Hg.

*Example 3*

The procedure of Example 1 was repeated replacing the cyclohexanone by 1.1 mole of cyclopentanone. The product was 1-oxa-4-thiaspiro-nonanone-2, a colorless liquid having an $n_D^{20}$ 1.5191, having a B.P. of 104–106° C. at 1.5 mm. Hg and having the formula

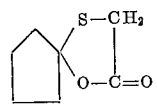

*Example 4*

The procedure of Example 1 was repeated replacing the cyclohexanone by 1.1 moles of caprylaldehyde. The product was 1-oxa-3-thia-2-heptylcyclopentanone-5, a colorless liquid having an $n_D^{20}$ 1.4810 and having a B.P. of 120–126° C. at 1.5 mm. Hg.

*Example 5*

The procedure of Example 1 was repeated replacing the cyclohexanone by 1.1 moles of 2-ethylbutyraldehyde. The product was 1-oxa-3-thia-2-(1'-ethyl) propylcyclopentanone-5, a colorless liquid having an $n_D^{21}$ 1.4902 and having a B.P. of 110–115° C. at 3 mm. Hg.

*Example 6*

1 mole of mercaptoacetic acid and 1.1 mole of benzaldehyde were refluxed in toluene. (The reactants together equalled 80% by weight of the total mixture.) There was employed 3 grams of p-toluene sulfonic acid as a catalyst. The refluxing was continued with removal of water until 18 grams of water had been removed. The product was washed with dilute aqueous sodium bicarbonate solution to remove water soluble materials. The toluene was distilled off and the product recovered was 1-oxa-3-thia-2-phenylpentanone-5, a white solid in the form of needles having an M.P. of 55–56° C.

*Example 7*

100 parts of Geon 101EP (vinyl chloride homopolymer) was mixed with 0.37 part dibutyltin oxide and 0.30 part of 1-oxa-4-thiaspiro-(4,5)-decanone-2 to form a heat stable product.

*Example 8*

Example 7 was repeated but 50 parts of dioctyl phthalate were included in the composition. The product was heat stable.

The oxathiolanes of the present invention can also be prepared by forming a thioketal or thioacetal from 2 moles of mercaptoacetic acid and 1 mole of the appropriate ketone or aldehyde and then heating to ring close with removal of 1 mole of mercaptoacetic acid.

What is claimed is:
1. 1-oxa-3-thia-2-alkylcyclopentanone-5 wherein the alkyl group has 1 to 17 carbon atoms.
2. 1-oxa-3-thia-cyclopentanone-5.
3. 1-oxa-3-thia-2,2-dialkylcyclopentanone-5 wherein each alkyl group has 1 to 17 carbon atoms.
4. 1-oxa-3-thia-2,2-diphenylcyclopentanone-5.
5. 1-oxa-3-thia-2,2-pentamethylene-cyclopentanone-5.
6. 1-oxa-3-thia-2,2-tetramethylene cyclopentanone-5.
7. A product according to claim 1 wherein the alkyl group has 1 to 8 carbon atoms.
8. A product according to claim 3 wherein the alkyl groups have 1 to 5 carbon atoms.

References Cited by the Examiner

UNITED STATES PATENTS 2,911,414  11/59  Simmons _____ 260—327
3,020,253  2/62  Lukes _____ 260—30.4

OTHER REFERENCES

Holmberg, Chem. Abstracts, 46, 100g (1953), Abstracted from Arkiv Kemi, 2: 567–579 (1950).
Holmberg, Chem. Zentr., I, page 395 (1943).

WALTER A. MODANCE, *Primary Examiner.*

NICHOLAS S. RIZZO, *Examiner.*